(12) United States Patent
Garon et al.

(10) Patent No.: US 12,347,027 B2
(45) Date of Patent: Jul. 1, 2025

(54) SYSTEMS AND METHODS FOR RENDERING VIRTUAL OBJECTS USING EDITABLE LIGHT-SOURCE PARAMETER ESTIMATION

(71) Applicant: TECHNOLOGIES DEPIX INC., Montreal (CA)

(72) Inventors: Mathieu Garon, Montreal (CA); Henrique Weber, Quebec (CA); Jean-Francois Lalonde, Quebec (CA)

(73) Assignee: Technologies Depix Inc., Montreal (CA)

( * ) Notice: Subject to any disclaimer, the term of this patent is extended or adjusted under 35 U.S.C. 154(b) by 237 days.

(21) Appl. No.: 18/196,887

(22) Filed: May 12, 2023

(65) Prior Publication Data

US 2023/0368459 A1 Nov. 16, 2023

Related U.S. Application Data

(60) Provisional application No. 63/364,588, filed on May 12, 2022.

(51) Int. Cl.
| | |
|---|---|
| *G06T 15/50* | (2011.01) |
| *G06T 15/04* | (2011.01) |
| *G06T 15/60* | (2006.01) |
| *G06V 10/82* | (2022.01) |

(52) U.S. Cl.
CPC .......... *G06T 15/506* (2013.01); *G06T 15/04* (2013.01); *G06T 15/60* (2013.01); *G06V 10/82* (2022.01)

(58) Field of Classification Search
None
See application file for complete search history.

(56) References Cited

U.S. PATENT DOCUMENTS

| | | | |
|---|---|---|---|
| 10,692,277 B1* | 6/2020 | Sunkavalli | G06V 20/20 |
| 2021/0065440 A1* | 3/2021 | Sunkavalli | G06T 7/90 |
| 2022/0189108 A1* | 6/2022 | Shandilya | G06F 18/21 |

(Continued)

OTHER PUBLICATIONS

Marques, Bruno & Clua, Esteban & Montenegro, Anselmo & Vasconcelos, Cristina. (2021). Spatially and color consistent environment lighting estimation using deep neural networks for mixed reality.

(Continued)

*Primary Examiner* — Nurun Flora
(74) *Attorney, Agent, or Firm* — Hickman Becker Bingham Ledesma LLP

(57) ABSTRACT

Methods are described for rendering a virtual object at a designated position in an input digital image corresponding to a perspective of a scene. In an embodiment, the method includes: estimating a set of lighting parameters using a lighting neural network; estimating a scene layout using a layout neural network; generating an environment texture map using a texture neural network using an input including the input digital image, the lighting parameters, and the scene layout; rendering the virtual object in a virtual scene constructed using the estimated lighting parameters, the scene layout, and the environment texture map; and compositing the rendered virtual object on the input digital image at the designated position. Corresponding systems and non-transitory computer-readable media are also described.

20 Claims, 4 Drawing Sheets

(56) References Cited

U.S. PATENT DOCUMENTS

2023/0140460 A1* 5/2023 Munkberg ............. G06N 3/045
                                                              345/423
2023/0245382 A1* 8/2023 Gardner ............. G06V 10/7715
                                                              345/426

OTHER PUBLICATIONS

Huang, G., Liu, Z., Van Der Maaten, L., & Weinberger, K. Q. (2017); Densely connected convolutional networks; Proceedings of the IEEE conference on computer vision and pattern recognition, 4700-4708.

Wang, T. C., Liu, M. Y., Zhu, J. Y., Tao, A., Kautz, J., & Catanzaro, B. (2018); High-resolution image synthesis and semantic manipulation with conditional GANs. Proceedings of the IEEE conference on computer vision and pattern recognition, 8798-8807.

Yang, C., Zheng, J., Dai, X., Tang, R., Ma, Y., & Yuan, X. (2022); Learning to Reconstruct 3D Non-Cuboid Room Layout from a Single RGB Image; Proceedings of the IEEE/CVF Winter Conference on Applications of Computer Vision, 2534-2543.

Debevec, P. (1998); Rendering synthetic objects into real scenes: Bridging traditional and image-based graphics with global illumination and high dynamic range photography; SIGGRAPH, 189-198.

Gardner, M. A., Hold-Geoffroy, Y., Sunkavalli, K., Gagné, C., & Lalonde, J. F. (2019); Deep parametric indoor lighting estimation; International Conference on Computer Vision, 7175-7183.

Li, T. M., Aittala, M., Durand, F., & Lehtinen, J. (2018); Differentiable Monte Carlo ray tracing through edge sampling; ACM Transactions on Graphics, 37(6), 1-11.

Kingma, D. P., & Ba, J. (2015); Adam: A method for stochastic optimization; 3rd International Conference for Learning Representations.

Gardner, M. A., Sunkavalli, K., Yumer, E., Shen, X., Gambaretto, E., Gagné, C., & Lalonde, J. F. (2017); Learning to predict indoor illumination from a single image; arXiv preprint, arXiv:1704.00090.

Lee, C.Y., Badrinarayanan, V., Malisiewicz, T., Rabinovich, A.: Roomnet: End-to-end room layout estimation. In: ICCV (2017).

* cited by examiner

SYSTEMS AND METHODS FOR RENDERING VIRTUAL OBJECTS USING EDITABLE LIGHT-SOURCE PARAMETER ESTIMATION

RELATED APPLICATION

The present application claims the benefit of and priority to provisional U.S. patent application No. 63/364,588 filed May 12, 2022, and entitled "SYSTEMS AND METHODS FOR RENDERING VIRTUAL OBJECTS USING EDITABLE LIGHT-SOURCE PARAMETER ESTIMATION", the entirety of which is incorporated herein by reference.

TECHNICAL FIELD

The technical field relates to digital image processing, and more specifically to systems and methods for rendering a virtual object at a designated position in an input digital image corresponding to a perspective of a scene.

BACKGROUND

Mixing virtual content realistically with real imagery is required in an increasing range of applications, from special effects, image edition, to augmented reality. This has created a need for capturing the lighting conditions of a scene with ever increasing accuracy and flexibility.

Existing solutions have proposed capturing lighting conditions with a high dynamic range light probe. Such techniques, dubbed "image based lighting", are still at the heart of lighting capture for high end special effects in movies. However, capturing lighting conditions with light probes generally is generally limited to professional users that have access to the scene and use specialized equipment.

To circumvent such limitations, alternative approaches that involve automatically estimating lighting conditions from standard images have been proposed. The trend with such approaches has been to move towards more and more complex lighting representations. However, while these lighting representations may yield realistic and spatially varying relighting results, they are disadvantageously opaque and do not lend themselves to being easily editable by a user. This can be very limiting when results need to be corrected for improved accuracy or when creative freedom is required.

There is therefore room for improvement.

SUMMARY

According to an aspect, a method is provided for rendering a virtual object at a designated position in an input digital image corresponding to a perspective of a scene, the method including: estimating a set of lighting parameters corresponding to a light source in the scene, the lighting parameters being estimated using a lighting neural network trained to map the input digital image to the set of lighting parameters; estimating a scene layout corresponding to a parametric representation of the scene, the scene layout being estimated using a layout neural network trained to map at least the input digital image to a parametric representation of the scene; obtaining an environment texture map corresponding to predicted textures of surfaces in an environment of the scene, the environment texture map being obtained using a texture neural network trained to predict a texture conditioned on an input including the input digital image, the lighting parameters, and the scene layout; rendering the virtual object in a virtual scene constructed using the estimated lighting parameters, the scene layout and the environment texture map; and compositing the rendered virtual object on the input digital image at the designated position.

In an embodiment, the lighting parameters include at least one of a light direction, a light distance, a light radius, a light colour and an ambient colour.

In an embodiment, the lighting neural network is trained using individual loss functions on each of the lighting parameters independently.

In an embodiment, estimating the scene layout includes generating a parametric representation of the perspective in the input digital image using a neural network trained to estimate a parametric representation from the input digital image, wherein the layout neural network is trained to map the input digital image and the parametric representation of the perspective in the input digital image to the parametric representation of the scene.

In an embodiment, the scene layout includes an edge map.

In an embodiment, the edge map includes a binary image indicating intersections of main planar surfaces in the scene.

In an embodiment, the binary image is a spherical image stored in equirectangular format.

In an embodiment, a resolution of the binary image is the same as a resolution of a binary image including the scene layout.

In an embodiment, estimating an environment texture map includes projecting the estimated lighting parameters in an equirectangular format, wherein the input includes the projected lighting parameters.

In an embodiment, the lighting parameters and scene layout are provided as equirectangular images, and the input includes the equirectangular images vertically concatenated on the input digital image.

In an embodiment, the texture network is trained using the same combination of losses as the layout network.

In an embodiment, the environment texture includes a spherical image stored in equirectangular format.

In an embodiment, the virtual scene is constructed by generating a mesh from the scene layout, applying the environment texture map to the mesh to produce a textured mesh, and positioning a lighting source in the textured mesh corresponding to the lighting parameters.

In an embodiment, the shape of the mesh is limited to a cuboid.

In an embodiment, generating the mesh includes detecting cuboid corners from the scene layout.

In an embodiment, the cuboid corners are detected using high pass filters.

In an embodiment, rendering the virtual object includes virtually positioning the virtual object in the textured mesh and rendering the virtual object relit according to the lighting parameters and the environment texture map in the virtual scene.

In an embodiment, the lighting parameters and the environment texture map are rendered in two rendering passes.

In an embodiment, the rendered virtual object is composited on the input digital image using differential rendering.

In an embodiment, the method further includes editing the lighting parameters and rendering the virtual object in the virtual scene constructed using the edited lighting parameters, the scene layout and the environment texture map.

In an embodiment, editing the lighting parameters includes editing shadow parameters and inferring the edited lighting parameters from the edited shadow parameters.

In an embodiment, the shadow parameters include at least one of a shadow position, a shadow opacity and a shadow blurriness.

According to an aspect, a system is provided for rendering a virtual object at a designated position in an input digital image corresponding to a perspective of a scene, the system including: a lighting module configured to map the input digital image to a set of lighting parameters; a layout module configured to trained to map at least the input digital image to a scene layout; a texture module configured to obtain an environment texture map conditioned an input including the input digital image, the lighting parameters, and the scene layout; and a rendering module configured to render the virtual object in a virtual scene constructed using the estimated lighting parameters, the scene layout and the environment texture map, and to composite the rendered virtual object on the input digital image at the designated position.

In an embodiment, the system further includes a layout reconstruction module configured to reconstruct a layout of the perspective in the input digital image, wherein the layout module is configured to map the input digital image and the layout of the perspective in the input digital image to the scene layout.

In an embodiment, the system further includes a virtual scene generating module configured to generate a textured cuboid mesh from the set of lighting parameters, the scene layout and the environment texture map.

In an embodiment, the system further includes a user interface module configured to receive an input and, responsive to the input, modify at least one of the lighting parameters and the scene layout, and cause the rendering module to render the virtual object in the virtual scene constructed using the modified lighting parameters, the modified scene layout and the environment texture map.

According to an aspect, a method is provided for rendering a virtual object at a designated position in an input digital image corresponding to a perspective of a scene. The method includes: estimating a set of lighting parameters representing a light source in the scene, the lighting parameters being estimated using a lighting neural network trained to map the input digital image to the set of lighting parameters; estimating a scene layout corresponding to a parametric representation of the scene, the scene layout being estimated using a layout neural network trained to map at least the input digital image to the parametric representation of the scene; generating an environment texture map corresponding to predicted textures of surfaces in an environment of the scene, the environment texture map being generated using a texture neural network trained to predict a texture conditioned on an input comprising the input digital image, the lighting parameters, and the scene layout; rendering the virtual object in a virtual scene constructed using the estimated lighting parameters, the scene layout, and the environment texture map; and compositing the rendered virtual object on the input digital image at the designated position.

According to an aspect, a system is provided for rendering a virtual object at a designated position in an input digital image corresponding to a perspective of a scene. The system includes one or more computers implementing: a lighting module configured to estimate a set of lighting parameters representing a light source in the scene, the lighting module comprising a lighting neural network trained to map the input digital image to the set of lighting parameters; a layout module configured to estimate a scene layout corresponding to a parametric representation of the scene, the layout module comprising a layout neural network trained to map at least the input digital image to the parametric representation of the scene; a texture module configured to generate an environment texture map corresponding to predicted textures of surfaces in an environment of the scene, the texture module comprising a texture neural network trained to predict a texture conditioned on an input comprising the input digital image, the lighting parameters, and the scene layout; and a rendering module configured to render the virtual object in a virtual scene constructed using the estimated lighting parameters, the scene layout, and the environment texture map; and to composite the rendered virtual object on the input digital image at the designated position.

According to an aspect, a non-transitory computer-readable medium is provided. The non-transitory computer-readable medium has instructions stored thereon which, when executed by one or more processors of one or more computing systems, cause the one or more computing systems to perform a method for rendering a virtual object at a designated position in an input digital image corresponding to a perspective of a scene, the method including: estimating a set of lighting parameters representing a light source in the scene, the lighting parameters being estimated using a lighting neural network trained to map the input digital image to the set of lighting parameters; estimating a scene layout corresponding to a parametric representation of the scene, the scene layout being estimated using a layout neural network trained to map at least the input digital image to the parametric representation of the scene; generating an environment texture map corresponding to predicted textures of surfaces in an environment of the scene, the environment texture map being generated using a texture neural network trained to predict a texture conditioned on an input comprising the input digital image, the lighting parameters, and the scene layout; rendering the virtual object in a virtual scene constructed using the estimated lighting parameters, the scene layout, and the environment texture map; and compositing the rendered virtual object on the input digital image at the designated position.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment.

DETAILED DESCRIPTION

Figure 1:
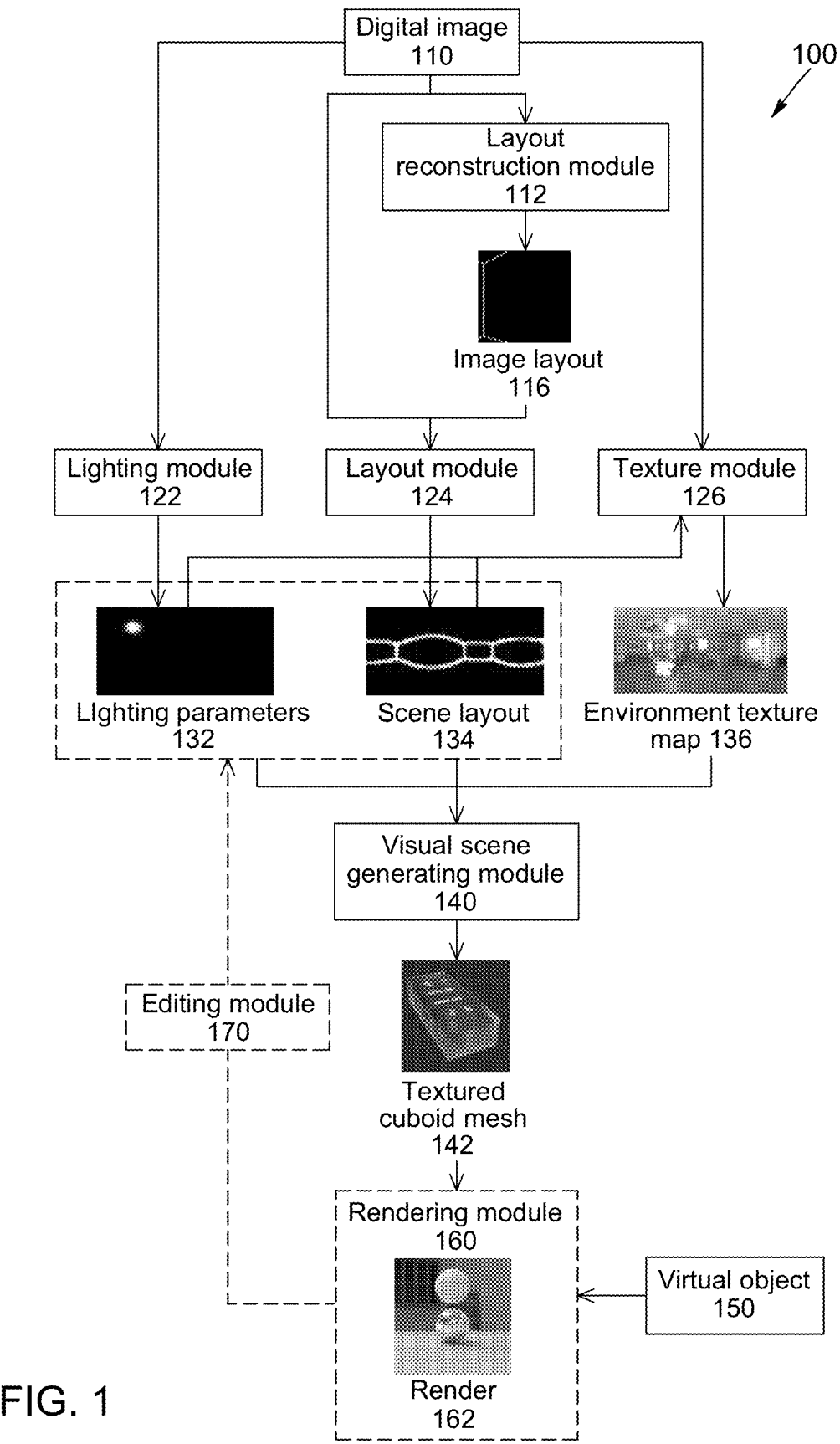
FIG. 1 is a schematic of a system for rendering a virtual object at a designated position in an input digital image corresponding to a perspective of a scene, according to an embodiment.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practised without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

With reference to FIG. 1, an exemplary system 100 for rendering a virtual object in a digital image is shown according to an embodiment. It is understood that the system 100 can be implemented using computer hardware elements, computer software elements or a combination thereof. Computational tasks of the system 100 and its various modules can be carried out on one or more processors (central processing units and/or graphical processing units) of one or more programmable computers. For example, and without limitation, the programmable computer may be a programmable logic unit, a mainframe computer, server, personal computer, cloud-based program or system, laptop, personal data assistant, cellular telephone, smartphone, wearable device, tablet device, virtual reality device, smart display devices such as a smart TV, set-top box, video game console, or portable video game device, among others.

In the illustrated embodiment, the system 100 is configured to render a virtual object 150 in an input digital image 110. The input digital image 110 can correspond to a digital depiction of scene, such as a digital photograph of a scene. The scene can include a scene layout, such as one or more objects positioned relative to an environment, such as a ground, walls and/or a ceiling of given dimensions. The scene can further include one or more lighting sources illuminating objects in the scene and/or the scene environment. The digital image can depict a given perspective of the scene, such as the perspective of a camera used to capture the digital image. As can be appreciated, the digital image 110 may only contain limited information about the scene. For example, the digital image 110 can depict portions of the scene layout, environment, and lighting within a field of view of the camera used to capture the digital image, while not including portions of the scene outside the camera field of view. As can be appreciated, the scene being depicted can be a real scene, such as an image of physical objects in a physical environment, a virtual scene, such as an image of virtual objects in a virtual environment, and/or a mix thereof.

The virtual object 150 can correspond to a computer-generated object that can be inserted into the scene depicted by the input digital image 110. The virtual object 150 can be of a predefined shape/size and have different reflectance properties. As will be described in more detail hereinafter, the system 100 can include modules for estimating different parameters of the scene, such that the virtual object 150 can be rendered at a desired position in the scene while taking into account lighting parameters and layout/environment to realistically render shadows and reflections associated with the virtual object 150.

In the illustrated embodiment, the system 100 comprises a lighting module 122 configured to estimate lighting parameters 132 of the scene, a layout module 124 configured to estimate a scene layout 134, and a texture module 126 configured to estimate an environment texture map 136 corresponding to textures of surfaces in an environment of the scene. The system 100 further comprises a virtual scene generating module 140 configured to construct a virtual scene from the estimated lighting parameters, scene layout and environment texture map, and a rendering module 160 configured to render the virtual object 150 in the virtual scene, and composite the rendered virtual object on the input digital image 110.

In more detail now, the lighting module 122 is configured to estimate, from the input digital image 110, lighting parameters 132 corresponding to lighting sources in the scene. Such parameters 132 can include a light direction with respect to the camera, a light distance with respect to the camera, a light radius, a light colour and an ambient colour. As an example, the light direction can be represented as a tridimensional real vector encoding tridimensional coordinates, the light distance and radius can each be represented by a real number encoding a measurement in metres, and the light and ambient colours can each be represented as a tridimensional real vector encoding a colour represented in RGB. Although a scene may contain a plurality of light sources, the lighting module 122 can be configured to estimate lighting parameters corresponding to a dominant light source in the scene depicted by the digital image 110. In embodiments where the scene contains a plurality of light sources, the dominant light source can correspond to one of the plurality of light sources that contributes most to the entire lighting of the scene, for example contributing to more than 60%, 80% or 95% of the total lighting in the scene. In other words, in embodiments where there are a plurality of light sources, the plurality of light sources can be approximated to a single light source by the lighting module 122, such that a single set of lighting parameters 132 can be estimated for a single approximated light source in the scene.

In the present embodiment, the lighting module 122 is configured to estimate the lighting parameters 132 using a neural network, referred to herein as a lighting network, trained to map an input digital image to a set of lighting parameters 132. The lighting network comprises a machine learning model trained on a training dataset comprising images of training scenes and corresponding ground truth lighting parameters of those training scenes. In some embodiments, the lighting network can be trained using a training dataset containing high dynamic range (HDR) photographs and corresponding ground truths comprising an HDR parametric light source for each photograph. In the present description, HDR can refer to photographs exhibiting a higher dynamic range of intensity, or luminosity, values than ordinarily obtained using consumer-grade digital or photographic film cameras, such as photographs having a range of intensity or luminosity greater than what can be expressed in an 8-bit variable, for instance in the range of values that can be expressed in a 10 to 14-bit variable. HDR photographs can avoid saturation of the sensor, for instance by allowing for higher intensity values and for more data in darker areas. In contrast, non-HDR photographs can be referred to low dynamic range (LDR) photographs, for example corresponding to photographs having a range of intensity or luminosity values limited to values that can be expressed in an 8-bit variable e.g., values between 0 and 255.

As can be appreciated, any suitable neural network can be used to implement the lighting network, such as a convolutional neural network. In an exemplary embodiment, the lighting network comprises a headless DenseNet-121 encoder described in Huang, G., Liu, Z., Van Der Maaten, L., & Weinberger, K. Q. (2017); Densely connected convolutional networks; *Proceedings of the IEEE conference on computer vision and pattern recognition*, 4700-4708, the disclosure of which is incorporated herein by reference in its entirety, followed by a fully connected layer and an output layer producing the lighting parameters 132. The light network can, for example, be trained on lighting parameters fitted on panoramas from an HDR dataset, as will be described in more detail hereinbelow.

The layout module 124 is configured to estimate, from the input digital image 110, a scene layout 134 corresponding to a parametric representation of the scene, such as a parametrized 3D layout of the scene. The scene layout 134 can, for example, comprise a cuboid-like model indicating the size and position of the main planar surfaces of the scene, such as the four walls, ceiling and ground of a room. The cuboid-like model can, for example, comprise a 3D cube parametrized by the position of its corners. In the present embodiment, the input digital image 110 is an RGB image, and the scene layout 134 generated by the layout module 124 is represented as a binary image, corresponding to an equirectangular projection of a spherical edge map indicating intersections of the planar surfaces of the scene. It is appreciated, however, that other configurations are possible.

The layout module 124 is configured to estimate the scene layout 134 using a neural network, referred to herein as a layout network. The layout network is trained to map at least an input digital image corresponding to a perspective view of a scene, to a scene layout 134 comprising a panoramic layout of the scene. In some embodiments, the layout network can be configured to operate on additional inputs in order to increase the accuracy of the estimation. For example, in the present embodiment, the layout network is trained to map the scene layout 134 from an input comprising both an input RGB image and a layout of the input image. The layout of the input image can correspond to a 3D layout of a portion of the scene viewed from the perspective of the input image, and can be represented in any suitable format, such as a binary image indicating intersections of planar surfaces in the input image. The layout network is thus trained to map the scene layout 134 from a channel-wise concatenation of the input RGB image and a binary image representing the layout of the input RGB image.

As can be appreciated, any suitable neural network can be used to implement the layout network, such as a convolutional neural network. In an exemplary embodiment, the layout network can have an architecture comprising the improved pix2pix framework described in Wang, T. C., Liu, M. Y., Zhu, J. Y., Tao, A., Kautz, J., & Catanzaro, B. (2018); High-resolution image synthesis and semantic manipulation with conditional GANs. Proceedings of the IEEE conference on computer vision and pattern recognition, 8798-8807, the disclosure of which is incorporated herein by reference in its entirety. The layout network can, for example, be trained on LDR images and corresponding ground truth layouts, as will be described in more detail hereinbelow. In the present embodiment, the layout module is trained using digital photographs taken with the camera having an elevation angle of 0 degree, i.e., pointing towards the horizon, and placed at a constant and known height above the ground, for instance 1.6 metres.

A preprocessing module can be provided to process the input digital image 110 in order to extract a layout therefrom. In the present embodiment, the preprocessing module comprises a layout reconstruction module 112 configured to reconstruct from an input RGB image a parametric representation corresponding to an image layout 116. The image layout 116 can correspond to a 3D layout of a portion of a scene viewed from the perspective of the input RGB image, and can be represented in any suitable format, such as a binary image indicating intersections of planar surfaces in the input RGB image. The generated binary image can have the same resolution as the input RGB image. The layout reconstruction module 112 can employ any suitable image processing techniques, for example using a neural network trained to estimate a parametric representation of a perspective from the input digital image, and/or using techniques such as those described in described in Yang, C., Zheng, J., Dai, X., Tang, R., Ma, Y., & Yuan, X. (2022); Learning to Reconstruct 3D Non-Cuboid Room Layout from a Single RGB Image; *Proceedings of the IEEE/CVF Winter Conference on Applications of Computer Vision,* 2534-2543, the disclosure of which is incorporated herein by reference in its entirety.

In the illustrated embodiment, the input digital image 110 and the image layout 116 extracted from the digital image 110 via reconstruction module 112 are provided as input to the layout module 124 to allow the layout module 124 to estimate the scene layout. It is appreciated, however, that other configurations are possible. For example, in some embodiments, the input provided to the layout module 124 can comprise the input digital image 110 and a blank layout, such as a binary image that is fully black.

The texture module 126 is configured to obtain an environment texture map 136 corresponding to textures of surfaces in the environment of the scene. The texture map 136 is conditioned on the input digital image 110, the lighting parameters 132, and the scene layout 134. In the present embodiment, texture map 136 is an RGB image of the same resolution as the scene layout 134, corresponding to an equirectangular projection of a spherical image.

The texture module 126 is configured to obtain the environment texture map 136 using a neural network, referred to herein as a texture network. In the present embodiment, the texture network is trained to map three input images to a predicted environment texture: an RGB image corresponding to input digital image 110, a first binary image corresponding to the lighting parameters 132 converted to a binary mask panorama in an equirectangular projection, and a second binary image corresponding to the scene layout 134 in an equirectangular projection. As can be appreciated, the first binary image can be generated by projecting the lighting parameters 132 using a subset of such parameters, for example using direction and size only. The texture network can be trained to map the environment texture map 136 from a concatenation of the three input images. Therefore, the input to the texture network can be generated by vertically concatenating the first and second binary images to the input digital image 110.

As can be appreciated, any suitable neural network can be used to implement the texture network, such as a convolutional neural network. In an exemplary embodiment, the texture network can have an architecture comprising the improved pix2pix framework mentioned above.

The virtual scene generating module 140 is configured to construct a virtual scene using the lighting parameters 132, scene layout 134, and environment texture map 136. As can be appreciated, the virtual scene constructed using such inputs can approximate the lighting and environment conditions of the real scene depicted in the input digital image 110.

In the present embodiment, the virtual scene generating module 140 carries out a series of steps to construct the virtual scene in the form of a textured mesh having a light source positioned therein. As a first step, a mesh can be generated from the scene layout 134. In the present embodiment, the scene layout 134 comprises a binary image defining an edge map, accordingly, high pass filters, such as a Sobel filters, can be applied to the binary image in order to detect corners therein. The detected corners can subsequently be back projected in order to convert the scene layout 134 into a 3D mesh. As can be appreciated, geometric constraints can be applied to simplify the back-projection of the scene corners into 3D. First, the shape of the mesh can be limited to a cuboid, i.e., a hexahedron where each pair of opposing faces is parallel. Second, since the layout module 124 is trained using digital panoramic photographs taken with the camera having an elevation angle of 0 degrees and placed at a constant and known height, the bottom corners of the scene layout 134 can easily be projected on the ground plane, and the top corners can be used to compute the ceiling height (for example averaged from the four corners). As a second step, the virtual scene generating module 140 can compute a texture map for each planar surface of the cuboid mesh. In particular, the environment texture map 136 can be warped around and projected upon each surface of the cuboid mesh, yielding a textured cuboid mesh 142. As a final step, a light source corresponding to lighting parameters 132 can be positioned relative to in the textured cuboid mesh 142. For example, an emitting sphere having a direction, position, size, and/or colour defined by lighting parameters 132 can be combined with the textured cuboid mesh 142.

The virtual scene generated by module 140 can subsequently be provided to rendering module 160 in order to render a virtual object 150 within the virtual scene subject to lighting and environment conditions that closely approximate the scene depicted by input digital image 110. More specifically, the virtual object 150 can be positioned within the textured cuboid mesh 142 at a designated position in the virtual scene, for example corresponding to a position of the scene depicted by the input digital image 110 where the virtual object is to be inserted. Once positioned, the virtual object 150 can be rendered from a perspective corresponding to a perspective of the camera used to capture input digital image 110. Parametric light and texture can be rendered by a rendering engine in two passes. As can be appreciated, any suitable rendering engine can be used, such as the Cycles engine, which is provided with the free and open-source 3D computer graphics software Blender. The rendering module 160 can subsequently composite the rendered virtual object 150 into the input digital image 110 using any suitable technique, for instance by using differential rendering as described in Debevec, P. (1998); Rendering synthetic objects into real scenes: Bridging traditional and image-based graphics with global illumination and high dynamic range photography; *SIGGRAPH,* 189-198, the disclosure of which is incorporated herein by reference in its entirety. The composited image results in a render 162 in which the virtual object 150 is effectively inserted into the scene represented by the input digital image 110, the virtual object 150 having realistic shading, shadows and reflections.

As can be appreciated, the pipeline implemented by system 100 can allow for the lighting conditions to be easily edited by users as needed, for example for artistic purposes and/or if the initially estimated lighting parameters do not match closely enough those from the input digital image 110. Accordingly, in some embodiments, an editing module 170 can be provided to allow user to edit the lighting parameters 132 initially estimated by lighting module 122. The edited lighting parameters can be provided to texture module 126 to generate a new environment texture map 136, triggering the virtual scene rendering module 140 to generate an updated virtual scene, and the rendering module 160 to create a new render 162 in accordance with the edited lighting parameters.

The editing module 170 can for instance comprise an application running on a user device, such as a computer or mobile device, and provide a graphical user interface (GUI) with controls allowing the lighting parameters 132 to be modified. As can be appreciated, the editing module 170 can be configured to generate the GUI in the form of a web page consisting of code in one or more computer languages, such as HTML, XML, CSS, JavaScript and ECMAScript. In some embodiments, the GUI can be generated programmatically, for instance on a server hosting the lighting, layout, texture and/or rendering modules 122, 124, 126, 160, and rendered by an application such as a web browser on the user device. In other embodiments, the editing module 170 can be configured to generate the GUI via a native application running on the user device, for example comprising graphical widgets configured to display the render 162 and/or to display and allow for the modification of the lighting parameters 132. The GUI can for instance provide controls allowing the user to edit the scalar and vector values corresponding to the lighting parameters 132, directly and/or by editing a visual representation of the lighting parameters 132, for instance an emitting sphere, with an input device such as a keyboard, a mouse, trackpad, touchscreen, etc. As an example, the user can modify the position (azimuth and/or elevation) of the emitting sphere, thereby editing the light direction parameter, and/or the emitting sphere size, thereby editing the radius parameter. In some embodiments, the GUI can provide controls allowing the user to modify the position, the opacity and/or the blurriness of a shadow cast by the virtual object 150 on a predicted ground plane position with respect to the camera in the render 162. The editing module 170 can be configured to infer abductively alternative lighting parameters conducive to casting a shadow as close as possible to the modified shadow, and to modify the lighting parameters 132 based on the inferred alternative lighting parameters to generate a corresponding render 162 with the specified shadows. In some embodiment, the user can additionally or alternatively modify the 3D layout of the scene, which can also trigger the computation of a new environment texture map 136 and therefore of a new textured cuboid mesh 142, and the compositing of a new render 162.

As can be appreciated, the system 100 described above can allow carrying out a method for rendering a virtual object at a designated position in an input digital image corresponding. A first step of the method can comprise receiving an input digital RGB image 110 corresponding to a perspective of a scene. The digital image 110 can be received by a computing device implementing the system 100, for example from memory and/or a camera associated with the computing device. A second step can comprise estimating lighting parameters via lighting module 122. A set of lighting parameters 132 corresponding to a light source in the scene can be estimated using a lighting neural network trained to map the input digital image 110 to the set of lighting parameters. As part of the estimation, a plurality of lighting sources in the digital image 110 can be approximated as a single lighting source.

A third step can comprise estimating a scene layout 134 corresponding to a 3D layout of the scene, via layout module 124. The scene layout can be estimated using a layout neural network trained to map at least the input digital image 110 to the 3D scene layout 134, for example in the form of a binary image defining an edge map. In some embodiments, the scene layout can be estimated using a layout neural network that is also trained to map from an image layout 116 corresponding to a 3D layout of the perspective in the input digital image 110. In such embodiments, the step of estimating the scene layout can further include reconstructing the 3D layout of the perspective in the input digital image 110 using a layout reconstruction module 112 comprising a neural network trained to reconstruct a 3D layout from the input digital image 110. The 3D layout can be reconstructed in the form of a binary image defining an edge map of surfaces visible in the digital image 110, and the binary image can be concatenated channel-wise with digital image 110 before being provided to the layout neural network. A fourth step can comprise estimating, via texture module 126, an environment texture map 136 corresponding to textures of surfaces in an environment of the scene depicted by digital image 110. The environment texture map 136 can be estimated using a texture neural network trained to predict the environment texture map 136 from an input comprising the input digital image 110, the lighting parameters 132, and the scene layout 134. As can be appreciated, the scene layout 134 can be provided as a binary image in equirectangular format, and the lighting parameters 132 can be projected as a binary mask in an equirectangular format. The equirectangular images can be vertically concatenated on the input digital image 110 before being provided as input to the texture neural network. A fifth step can comprise rendering the virtual object 150 in a virtual scene constructed using the estimated lighting parameters, the scene layout and the environment texture map. The virtual scene can be constructed via virtual scene generating module 140 configured to generate a mesh from the scene layout, apply the environment texture map to the mesh to produce a textured mesh 142, and position a lighting source in the textured mesh 142 corresponding to the lighting parameters 132. Rendering the virtual object 150 can comprise virtually positioning the virtual object 150 in the textured mesh and rendering the virtual object relit according to the lighting parameters and the environment texture map in the virtual scene.

Finally, a sixth step can comprise compositing the rendered virtual object 150 on the input digital image 110 at the designated position in order to produce a render 162 comprising the virtual object 150 inserted in the digital image 110.

Figure 2A:
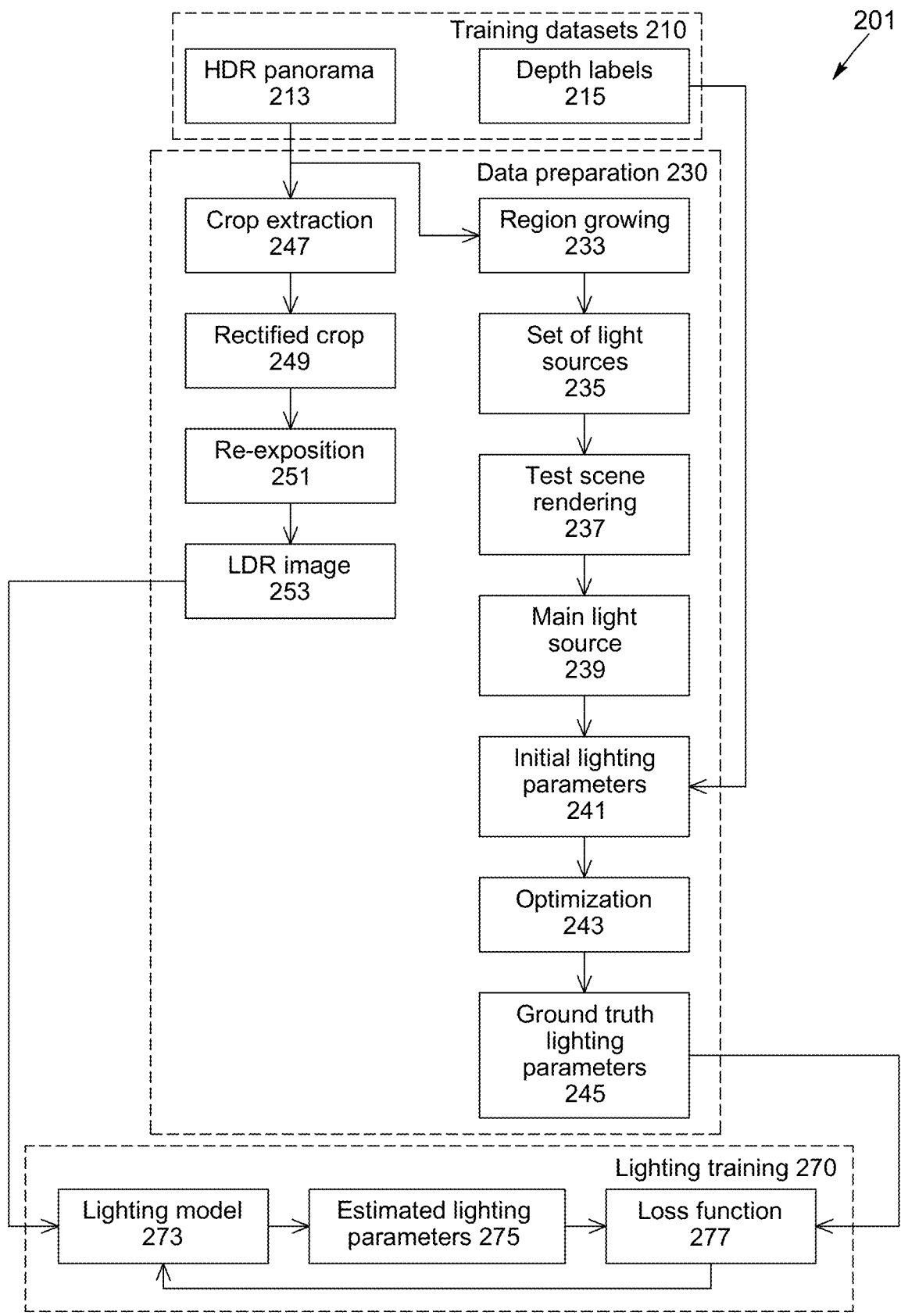
FIGS. 2A, 2B and 2C are schematic of methods for training neural networks used respectively to estimate the lighting parameters, the layout and a texture map in an input digital image corresponding to a perspective of a scene, according to an embodiment.

In some embodiments, subsequent steps can be carried out allowing the lighting parameters to be modified such that the resulting render 162 can be adjusted as needed. For example, such steps can comprise receiving, via a user device, a user input corresponding to modified lighting parameters 132. In some embodiments, the render 162 can be displayed to a user via a GUI of a user device, said render 162 comprising a shadow projected by the virtual object 150 composited thereon. A user input can be received corresponding to a modification of one or more parameters of the shadow, such as the shadow position, opacity and/or blurriness, and modified lighting parameters that would result in the modified shadow can be calculated. The third through fifth steps described above can subsequently be carried out on the modified lighting parameters to produce an updated render 162. With reference now to FIG. 2A, an exemplary method 201 to train a lighting parameters estimation neutral network model 273 for use in lighting module 122 will be described. In the present embodiment, training datasets 210 are provided, comprising HDR panoramas 213 and corresponding depth labels 215. The depth labels 215 indicate the depth of each pixel in the tridimensional scene corresponding to the bidimensional HDR panorama 213, effectively corresponding to a depth map. In the present embodiment, ground truth lighting parameters 245 corresponding to the HDR panoramas will be computed from each HDR panorama 213 and corresponding depth labels 215 as part of data preparation 230 steps. It is appreciated, however, that in other embodiments, the provided training datasets 210 can already comprise the ground truth lighting parameters 245.

As part of the data preparation steps 230, a set of light sources 235 can be obtained by implementing a region growing 233 process, such as the one described in Gardner, M. A., Hold-Geoffroy, Y., Sunkavalli, K., Gagne, C., & Lalonde, J. F. (2019); Deep parametric indoor lighting estimation; *International Conference on Computer Vision*, 7175-7183 and international application WO 2021/042208 A1, the disclosures of which are incorporated herein by reference in their entireties. Each light source acquired through region growing 233 is associated with a region of the panorama where it was detected, referred to as a light region. Given each light region, the light contribution of each of the light sources 235 can be estimated by rendering a test scene 237. The test scene can comprise a plurality of virtual objects arranged on a ground plane and viewed from above, for example nine diffuse spheres arranged in a three-by-three grid on a diffuse ground plane. Pronounced shadows in the rendered test scenes can indicate that a strong light source is contributing disproportionately to the energy. The light source associated with the region transmitting the highest energy to the test scene can thus be retained as the main or dominant light source 239. From the region with the highest light contribution, initial lighting parameters 241 can be estimated. For instance, the light direction can be initialized as the region centroid, the light distance can be initialized as the average depth of the region according to depth labels 215, the light radius can be initialized from the length of the major and minor axes of an ellipse fitted in the region, and the light and ambient colours can be initialized with a least squares fit to a rendering of the test scene using the HDR panorama. An optimization step 243 can then be performed to refine the initial lighting parameters 241 into optimized lighting parameters which can be used as ground truth lighting parameters 245:

$$p^* = \arg\min_{p} \|\mathcal{R}(p) - \mathcal{R}(\tilde{p})\|_2$$

where $\mathcal{R}(x)$ is a differentiable rendering operator that renders a test scene using candidate lighting parameters p and the partially optimized lighting parameters $\tilde{p}$ found in the previous optimization step, yielding the ground truth lighting parameters 245 p*. By way of example, $\mathcal{R}(x)$ can be implemented for example implemented via the Redner differentiable renderer described in Li, T. M., Aittala, M., Durand, F., & Lehtinen, J. (2018); Differentiable Monte Carlo ray tracing through edge sampling; *ACM Transactions on Graphics*, 37(6), 1-11, the disclosure of which is incorporated herein by reference in its entirety. This optimization 243 can be performed by applying a stochastic gradient descent algorithm. In some embodiments, modified algorithms such as the adaptive gradient algorithm or the root mean square propagation algorithm can be used for optimization. In some embodiments, an adaptive moment estimation (Adam) algorithm can be used, as described in Kingma, D. P., & Ba, J. (2015); Adam: A method for stochastic optimization; *3rd International Conference for Learning Representations*, the disclosure of which is incorporated herein by reference in its entirety.

Once the data is prepared, the lighting model 273 can be trained as part of lighting training steps 270. The lighting training 270 can comprise optimizing lighting model 273, taking as input an LDR image 253 and generating as output estimated lighting parameters 275, which are compared to the ground truth lighting parameters 245 through a loss function 277. In the present embodiment, LDR images 253 used as input for the training are obtained from each HDR panorama 213 by first extracting rectified crops 249, for instance RGB images of a size of $128^2$ pixels, by a crop extraction step 247, for example as described in Gardner, M. A., Sunkavalli, K., Yumer, E., Shen, X., Gambaretto, E., Gagné, C., & Lalonde, J. F. (2017); Learning to predict indoor illumination from a single image; *arXiv preprint*, arXiv:1704.00090, the disclosure of which is incorporated herein by reference in its entirety. A re-exposition step 251 is then applied to each rectified crop 249, thereby mapping it to a corresponding LDR image 253. As an example, the re-exposition step 251 can comprise re-exposing the crop 249 to bring its median intensity to a predefined point, for instance, 0.45, clipping areas with an intensity above a predefined threshold, for instance 1, and applying tone mapping, for instance using gamma compression using a predefined y value below 1, such as ½.4. In some embodiments, as an alternative, the re-sampling step 255 described below in method 203 can be used instead of the re-exposition step 251. In some embodiments, the loss function 277 can aggregate different functions applied to different lighting parameters 245, 275. As an example, the $L_1$ loss function can be used for the light colour, and the $L_2$ loss function can be used for light direction, distance and radius as well as for ambient colour. In some embodiments, the loss function for one of the lighting parameters can itself aggregate more than one loss function. As an example, the loss function for the light colour can be an aggregation of the $L_1$ and the angular loss functions, and/or the loss function for the ambient colour can be an aggregation of the $L_2$ and the angular loss functions. Using angular loss can help enforce colour consistency. The aggregation can for instance be a mean function or a weighted mean function. In some embodiments, the weights in the weighted mean function are obtained through Bayesian optimization on a portion of the training datasets 210 set aside as a validation set.

Figure 2B:
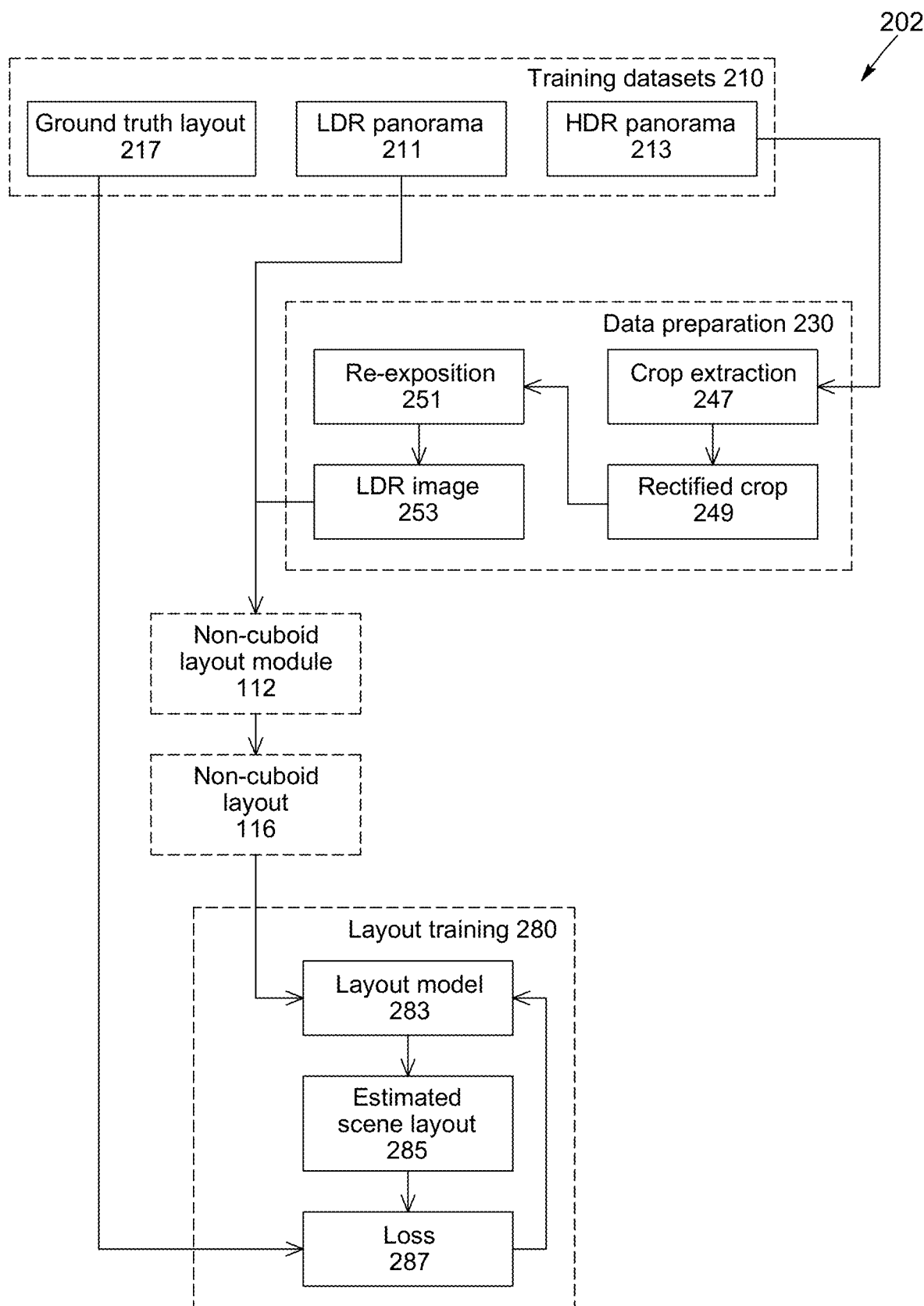

With reference now to FIG. 2B, an exemplary method 202 to train a layout estimation neutral network model 283 for use in a layout module 124 will be described. In some embodiments, both LDR panoramas 211 and HDR panoramas 213 can be used as input to train the layout model 283, which generates an estimated scene layout 285 for comparison against a ground truth layout 217 through a loss function 287 to optimize the model 283. Where HDR panoramas 213 are used, those panoramas can be converted to LDR images during data preparation 230 by applying either the re-exposition step 251 described above with respect to method 201 or the re-sampling step 255 described below with respect to method 203. In some embodiments, the panoramas 211, 213 are additionally sent through the layout reconstruction module 112 to obtain a parametric representation of a layout 116 which is fed as an additional input to the layout model 283. As an example, each channel of the layout reconstruction module 112 can be concatenated with the corresponding channel of the input panorama 211, 213. The layout training 280 can comprise a combination of generative adversarial network methodology, feature matching and perceptual losses, for example as employed in Wang (2018), op. cit., and using the same default weights as described therein.

Figure 2C:
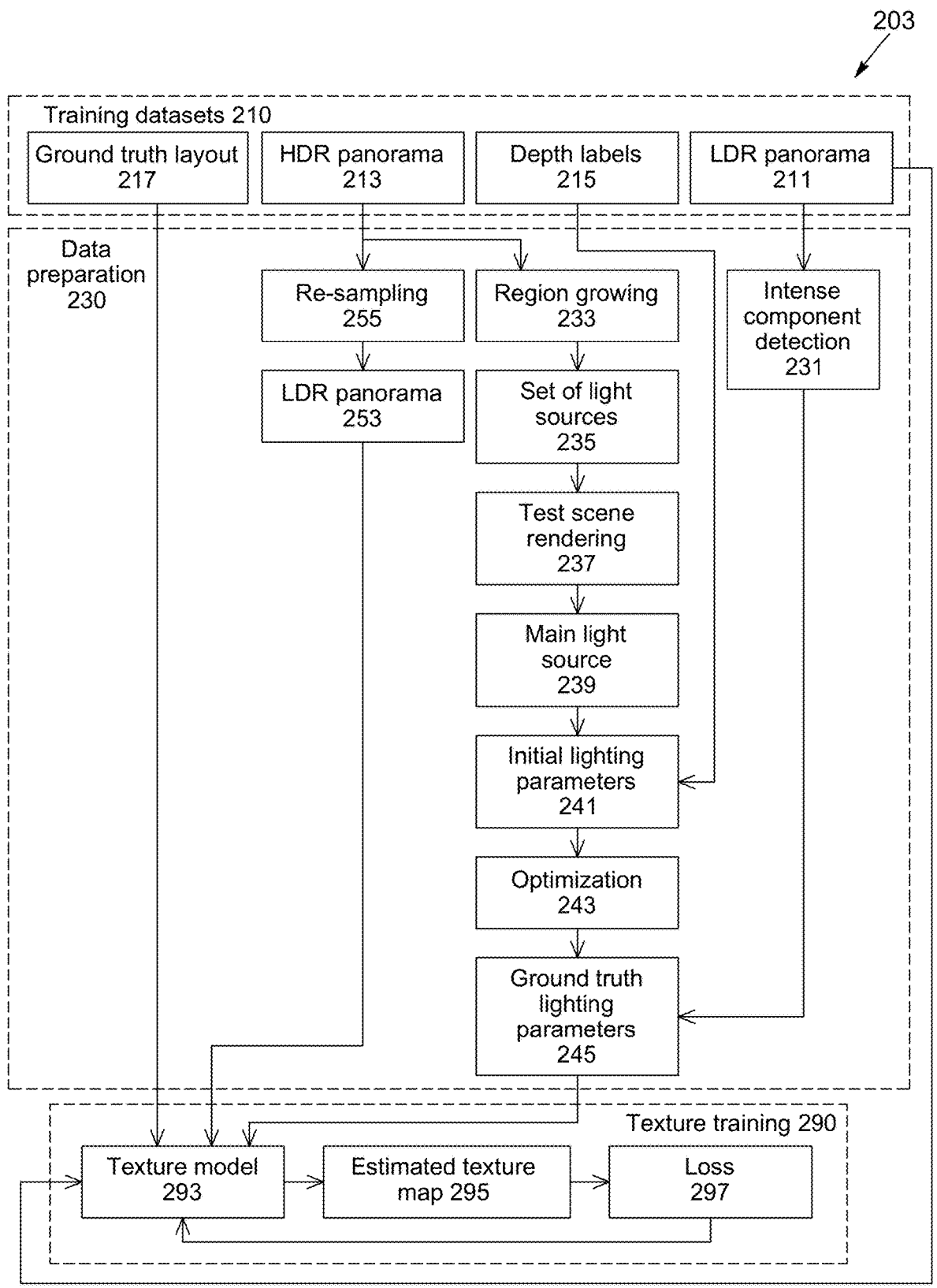

With now reference to FIG. 2C, an exemplary method 203 to train a texture estimation neutral network model 293 for use in a texture module 126 will be described. In some embodiments, both LDR panoramas 211 and HDR panoramas 213 can be used as input to train the layout model 293, along with the corresponding ground truth layouts 217 and ground truth light parameters 245. When using HDR panoramas 213, the light parameters can for instance be determined through steps 233 to 243 as described above for method 201 to obtain ground truth lighting parameters 245 for use as input to the texture model 293. When using LDR panoramas 211, an intensity component detection step 231 can be carried out, wherein the largest connected component whose intensity is above a predetermined threshold in an upper region of the panorama, such as above the 98th percentile over the upper half of the panorama, is determined and used as an estimate light position for use in the ground truth lighting parameters 245. As part of data preparation 230, an HDR panorama 213 can be converted to a corresponding LDR image 253. It can be appreciated that this can be performed using the re-exposition step 251 from method 201. In some embodiments, a re-sampling step 253 can alternatively be used, wherein a scale factor is determined to map a maximum intensity of a crop taken from the HDR panorama 213 to a predetermined range, for example such that a crop taken from the HDR panorama 213 has its intensity 90th percentile mapped to an intensity of 0.8. This scale factor can then applied to the panorama such that its scale matches the one of the crop. The texture training 290 can be performed using the same method as the layout training 280, comprising a combination of generative adversarial network methodology, feature matching and perceptual losses, for example as employed in Wang (2018), op. cit., and using the same default weights as described therein While the above description provides exemplary embodiments of systems and methods for rendering virtual objects, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The systems and methods described above can allow for an intuitive, simple and natural estimated lighting representation that can easily be edited by a user, should the estimate not perfectly match the background image, or simply for artistic purposes. The user can for instance rotate the light source about its azimuth angle or change its elevation angle and/or size, and the estimated texture can remain consistent with the desired light parameters, while preserving the same overall structure. The renders can thereby exhibit realistic reflections and shadows that correspond to the desired lighting parameters. According to the systems and methods described herein, reflective objects can be realistically rendered with editable lighting conditions, and rendering is not limited to diffuse objects as is the case with existing methods.

Using lighting parameters from only one, dominant light source represents an approximation approach that can result in both better interpretability for the end user and more performant computations. Through experimentation, it can be shown that this approach does not entail a performance trade-off. By rendering a number of scenes from panoramas in a testing subset of the training datasets 210 using both their ground truth environment maps and the exemplary system 100, it was determined that a single dominant light source contributes to more than 95% of the lighting in 75% of the images, to more than 80% of the images in 50% of the images, and to more than 60% of the lighting in 25% of the images in the training datasets 210. To further validate that the exemplary system 100, 2,240 images were extracted from a testing portion of a training dataset 210 comprising 224 HDR panoramas following the protocol described in Gardner (2017), op. cit., test scenes were rendered, composed of an array of spheres viewed from above, and error metrics were computed to compare the resulting rendering with a ground truth obtained with the original HDR panorama. The metrics comprised the root-mean-square error (RMSE), the scatter index computed from the RMSE, the peak signal-to-noise ratio and the RGB angular error, as well as the Fréchet inception distance computed on the resulting environment maps. The metrics were measured and averaged to compute the performance of the exemplary system embodiment 100 disclosed herein, of the system described in Gardner (2017), op. cit., of the system described in Gardner (2019) and WO 2021/042208 A1, op. cit., both using one and three lights, of the system described in Garon, M., Sunkavalli, K., Hadap, S., Carr, N., & Lalonde, J. F. (2019); Fast spatially-varying indoor lighting estimation; *Proceedings of the IEEE/CVF Conference,* 6908-6917, and of the system described in Srinivasan, P. P., Mildenhall, B., Tancik, M., Barron, J. T., Tucker, R., & Snavely, N. (2020); Lighthouse: Predicting lighting volumes for spatially-coherent illumination; *Proceedings of the IEEE/CVF Conference,* 8080-8089. The exemplary system embodiment 100 outperformed all the other tested systems on all the defined metrics.

The invention claimed is:

1. A method for rendering a virtual object at a designated position in an input digital image corresponding to a perspective of a scene, the method comprising:
   estimating a set of lighting parameters representing a light source in the scene, the lighting parameters being estimated using a lighting neural network trained to map the input digital image to the set of lighting parameters;
   estimating a scene layout corresponding to a parametric representation of the scene, the scene layout being estimated using a layout neural network trained to map at least the input digital image to the parametric representation of the scene;
   generating an environment texture map corresponding to predicted textures of surfaces in an environment of the scene, the environment texture map being generated using a texture neural network trained to predict a texture conditioned on an input comprising the input digital image, the lighting parameters, and the scene layout;
   rendering the virtual object in a virtual scene constructed using the estimated lighting parameters, the scene layout, and the environment texture map; and
   compositing the rendered virtual object on the input digital image at the designated position.

2. The method according to claim 1, wherein the virtual scene is constructed by: generating a mesh from the scene layout, applying the environment texture map to the mesh to produce a textured mesh, and positioning a lighting source in the textured mesh corresponding to the lighting parameters.

3. The method according to claim 2, wherein rendering the virtual object comprises: virtually positioning the virtual object in the textured mesh, and lighting the virtual object within the textured mesh by applying a virtual light source corresponding to the lighting parameters.

4. The method according to claim 2, wherein a shape of the mesh is limited to a cuboid.

5. The method of claim 1, wherein the lighting parameters comprise at least one of: a light direction, a light distance, a light radius, a light colour, and an ambient colour.

6. The method according to claim 5, wherein the lighting neural network is trained using individual loss functions on each of the lighting parameters independently.

7. The method according to claim 1, wherein the scene comprises a plurality of light sources, and the lighting neural network is trained to map the input digital image to a single a single set of lighting parameters representing a single approximated light source in the scene.

8. The method according to claim 1, comprising receiving a user input corresponding to edits to the lighting parameters, and rendering the virtual object in a virtual scene constructed using: the scene layout, the environment texture map, and the edited lighting parameters.

9. The method according to claim 8, comprising generating a new environment texture map by providing the input digital image, the scene layout, and the edited lighting parameters as input to the texture neural network, and rendering the virtual object in a virtual scene constructed using: the scene layout, the new environment texture map, and the edited lighting parameters.

10. The method according to claim 8, comprising receiving a user input corresponding to edits to the scene layout, and rendering the virtual object in a virtual scene constructed using: the environment texture map, the edited lighting parameters, and the edited scene layout.

11. The method according to claim 10, comprising generating a new environment texture map by providing the input digital image, the edited lighting parameters, and the edited scene layout as input to the texture neural network, and rendering the virtual object in a virtual scene constructed using: the new environment texture map, the edited lighting parameters, and the edited scene layout.

12. The method according to claim 8, wherein the user inputs correspond to edits to shadows cast by the object in the virtual scene constructed using the estimated lighting parameters, the scene layout, and the environment texture map; and inferring the edits to the lighting parameters from the edited shadow parameters.

13. The method according to claim 12, wherein the shadow parameters comprise at least one of: a shadow position, a shadow opacity, and a shadow blurriness.

14. The method according to claim 1, wherein the texture neural network is trained to predict the environment texture map from an input comprising the input digital image, an image representing the lighting parameters, and an image representing the scene layout; and generating the environment texture map comprises:
   generating a first binary image corresponding to the lighting parameters converted to a binary mask in an equirectangular projection;
   generating a second binary image corresponding to the scene layout converted to a binary mask in an equirectangular projection; and
   providing the input digital image, the first binary image, and the second binary image as input to the texture neural network.

15. The method according to claim 14, wherein the texture neural network is trained to predict the environment texture map from an input comprising a vertical concatenation of the input digital image, the image representing the lighting parameters, and the image representing the scene layout; and generating the environment texture map comprises:

generating a concatenated image by vertically concatenating the input digital image, the first binary image, and the second binary image; and providing the concatenated image as input to the texture neural network.

16. The method according to claim 1, wherein the layout neural network is trained to estimate the scene layout from an input comprising the input digital image, and a parametric representation of a perspective of the input digital image.

17. The method according to claim 16, wherein the parametric representation of the perspective of the input digital image comprises a binary image indicating intersections of planar surfaces in the input digital image.

18. The method according to claim 16, further comprising generating the parametric representation of the perspective of the input digital using a neural network trained to estimate the parametric representation of the perspective from the input digital image.

19. A system for rendering a virtual object at a designated position in an input digital image corresponding to a perspective of a scene, the system comprising one or more computers implementing:

a lighting module configured to estimate a set of lighting parameters representing a light source in the scene, the lighting module comprising a lighting neural network trained to map the input digital image to the set of lighting parameters;

a layout module configured to estimate a scene layout corresponding to a parametric representation of the scene, the layout module comprising a layout neural network trained to map at least the input digital image to the parametric representation of the scene;

a texture module configured to generate an environment texture map corresponding to predicted textures of surfaces in an environment of the scene, the texture module comprising a texture neural network trained to predict a texture conditioned on an input comprising the input digital image, the lighting parameters, and the scene layout; and a rendering module configured to render the virtual object in a virtual scene constructed using the estimated lighting parameters, the scene layout, and the environment texture map; and to composite the rendered virtual object on the input digital image at the designated position.

20. A non-transitory computer-readable medium having instructions stored thereon which, when executed by one or more processors of one or more computing systems, cause the one or more computing systems to perform a method for rendering a virtual object at a designated position in an input digital image corresponding to a perspective of a scene, the method comprising:

estimating a set of lighting parameters representing a light source in the scene, the lighting parameters being estimated using a lighting neural network trained to map the input digital image to the set of lighting parameters;

estimating a scene layout corresponding to a parametric representation of the scene, the scene layout being estimated using a layout neural network trained to map at least the input digital image to the parametric representation of the scene;

generating an environment texture map corresponding to predicted textures of surfaces in an environment of the scene, the environment texture map being generated using a texture neural network trained to predict a texture conditioned on an input comprising the input digital image, the lighting parameters, and the scene layout;

rendering the virtual object in a virtual scene constructed using the estimated lighting parameters, the scene layout, and the environment texture map; and compositing the rendered virtual object on the input digital image at the designated position.

* * * * *